No. 817,734. PATENTED APR. 10, 1906.
W. VON BOLTON.
INCANDESCING BODY FOR LIGHTING PURPOSES.
APPLICATION FILED MAY 31, 1902.
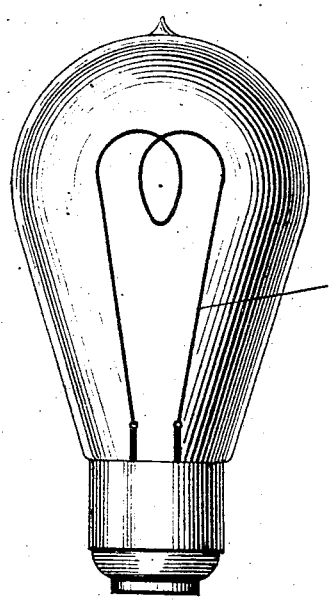
homogeneous metallic body containing metal of the vanadium group.
WITNESSES:
Florence Mafuse Patrick
INVENTOR
Werner von Bolton,
BY
Georgii & Massie
His Attorneys

UNITED STATES PATENT OFFICE.

WERNER VON BOLTON, OF CHARLOTTENBURG, GERMANY, ASSIGNOR TO SIEMENS & HALSKE AKTIENGESELLSCHAFT, OF BERLIN, GERMANY.

INCANDESCING BODY FOR LIGHTING PURPOSES.

No. 817,734.     Specification of Letters Patent.     Patented April 10, 1906.

Application filed May 31, 1902. Serial No. 109,793.

*To all whom it may concern:*

Be it known that I, WERNER VON BOLTON, chemist, a subject of the Russian Emperor, residing at 69 Goethestrasse, Charlottenburg, near Berlin, Germany, have invented certain new and useful Improvements in Incandescing Bodies for Lighting Purposes; and I do hereby declare the following to be a full, clear, and exact description of the invention, such as will enable others skilled in the art to which it appertains to make and use the same.

My invention relates to improvements in incandescing bodies for electric lamps.

The object of my invention is to provide an incandescing body which will have a high light-emitting efficiency, will give a light of a color suitable and pleasing for illuminating purposes, will be sufficiently durable to meet commercial requirements, and can be manufactured at a reasonable cost.

Although many attempts have been made heretofore to produce an incandescing body which would have an appreciably higher light-emitting efficiency than the carbon glowers in general use up to the time of my invention, such attempts had not been successful, so far as I am aware.

An incandescing body embodying my invention has such important advantages over the glowers heretofore known as to render it entirely successful.

After a long series of experiments I have found that substantially pure metals of the vanadium group have characteristics which make them peculiarly advantageous as light-emitting constituents of an illuminant. The first and most important characteristic of pure metal of the vanadium group is that its light-emitting efficiency is very high compared with anything heretofore known. Another important characteristic of such pure metal is that the color of the light—that is to say, its spectrum—is pleasing to the eye and satisfactory for purposes of illumination, it being the continuous spectrum of an incandescent solid. In addition to these characteristics, such metals have a high melting-point (particularly tantalum, which has an exceedingly high melting-point—namely, above 2,000° Celsius) and are not scattered by thermal and electrical action, as are carbon filaments, while at the same time possessing sufficient specific resistance to make them suitable for such purpose.

My invention consists in an incandescing body whose light-emitting properties are dependent upon the presence of substantially pure metal of the vanadium group.

An incandescing body embodying my invention may consist wholly of one metal of the vanadium group, such as tantalum in its pure or substantially pure metallic form, or may be formed by intermingling, mixing, or alloying a plurality of such substantially pure metals of the vanadium group.

In the present application, although I claim generically an incandescing body whose light-emitting properties are dependent upon the presence of a substantially pure metal of the vanadium group, I do not claim specifically an incandescing body consisting wholly of one such metal, as that forms the subject-matter of my application, Serial No. 293,616, filed December 28, 1905, divided out of this application by requirement of the Commissioner of Patents, the specific claims of this application being based upon an incandescing body composed of a mixture or alloy of two or more substantially pure metals of the vanadium group.

It is to be observed that I use the term "substantially pure metal of the vanadium group." This is for the reason that there have heretofore been known certain compounds called "tantalum" which were supposed to be the metal tantalum, but which, as I have discovered, were not. The aforesaid so-called "tantalum" was either an oxid, a hydrid, or a carbid of tantalum and in every case had properties quite different from the true metal.

I am the first to produce pure metal of the vanadium group and the first to discover its remarkable properties as a light-emitting body. The properties of the substantially pure metal of the vanadium group are radically different from the material hitherto known. While the latter was said to be brittle and could not be wrought, substantially pure metal of the said group is exceedingly ductile and can be wrought—that is to say; welded, hammered, rolled, and drawn—in other words, manipulated in a manner which differentiates it essentially from the material hitherto known. Thus from the material employed by me a wrought filament may be produced, while from the material hitherto known the production of such a wrought filament was an impossibility.

I will now describe some processes of making an incandescent body embodying my invention.

In order to first obtain a coherent metallic body of metal of the vanadium group, I mix the amorphous powder of such a metal, in which form the impure metal is commonly obtainable, with suitable binding substances, which may be volatile, and I have found that paraffin is a good and useful binding substance for this purpose. The resulting plastic mass may be pressed so as to take the shape which will be the most convenient for further treatment. I have also found by experiments that the amorphous powder of tantalum metal can be transformed into a coherent body by high pressure, so that no binding substance is necessary. According to the pressure employed, I obtain a more or less strong and coherent metallic body. If organic binding substances, such as paraffin, are used, the resulting body is placed in an oven to drive out the binding substance. The body thus obtained is then heated by means of an electric current in the absence of air or *in vacuo*. Under the influence of the heat produced by the electric current a sintered or molten homogeneous metallic body is obtained which is ductile, and thus can be hammered, forged, rolled, or drawn to a wire, and I prefer to reduce the homogeneous metallic body obtained in the above-described manner to rods or the like of suitable cross-section by pressing, rolling, or the like and then to draw wires from said rods, whereby a wrought metal of the vanadium group is obtained, the said wires then being ready for use as wrought filaments.

The incandescing bodies obtained according to my said invention may be employed in the usual way in a glass bulb *in vacuo*. It is found to be unnecessary to exhaust the bulb beyond the point at which no aureole appears.

The above process relates to the production of an incandescing body consisting of one metal of the vanadium group in a substantially pure condition. As hereinbefore stated, an incandescing body of this kind is not claimed specifically herein.

Instead of carrying out the process by starting with an amorphous powder of one metal of the vanadium group I may use a mixture of the amorphous powders of different metals of the vanadium group and treat this mixture as described above, thereby obtaining an incandescing body which is composed of a mixture or alloy of metal of the vanadium group, or after obtaining the substantial pure and ductile metals separately by the process described these may be mixed, intermingled, or alloyed, and from the resultant product the desired incandescent body may be formed by hammering, rolling, or drawing to produce the wrought filament of the compound metal.

In the accompanying drawing I have illustrated a glow-lamp having a filament in one of the many forms in which my invention may be employed, it being assumed that the particular filament illustrated is composed of tantalum and vanadium.

Having thus fully described my invention, what I claim is—

1. A homogeneous metallic glower for incandescent lights containing ductile metal of the vanadium group, the light-emitting properties of the glower being due to the presence of this metal.

2. A glower for incandescent lights containing homogeneous ductile alloy of metals of the vanadium group, the light-emitting properties of the glower being due to the presence of such alloy.

3. A glower for incandescent lights consisting of an alloy of metals of the vanadium group.

4. A glower for electric glow-lamps composed of a wrought filament of an alloy of metals of the vanadium group.

In testimony whereof I have affixed my signature in presence of two witnesses.

WERNER VON BOLTON.

Witnesses:
 HENRY HASPER,
 WOLDEMAR HAUPT.